Feb. 12, 1957 R. R. ROSSI 2,781,428
AUTOMOTIVE SIGNAL LIGHT CONTROL SWITCH
Filed Nov. 26, 1951 2 Sheets-Sheet 1

INVENTOR.
ROBERT R. ROSSI
BY
ATTORNEYS

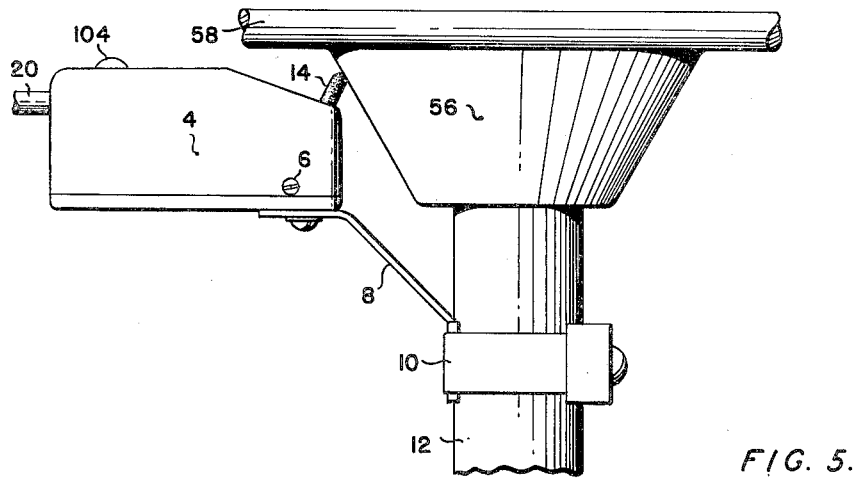
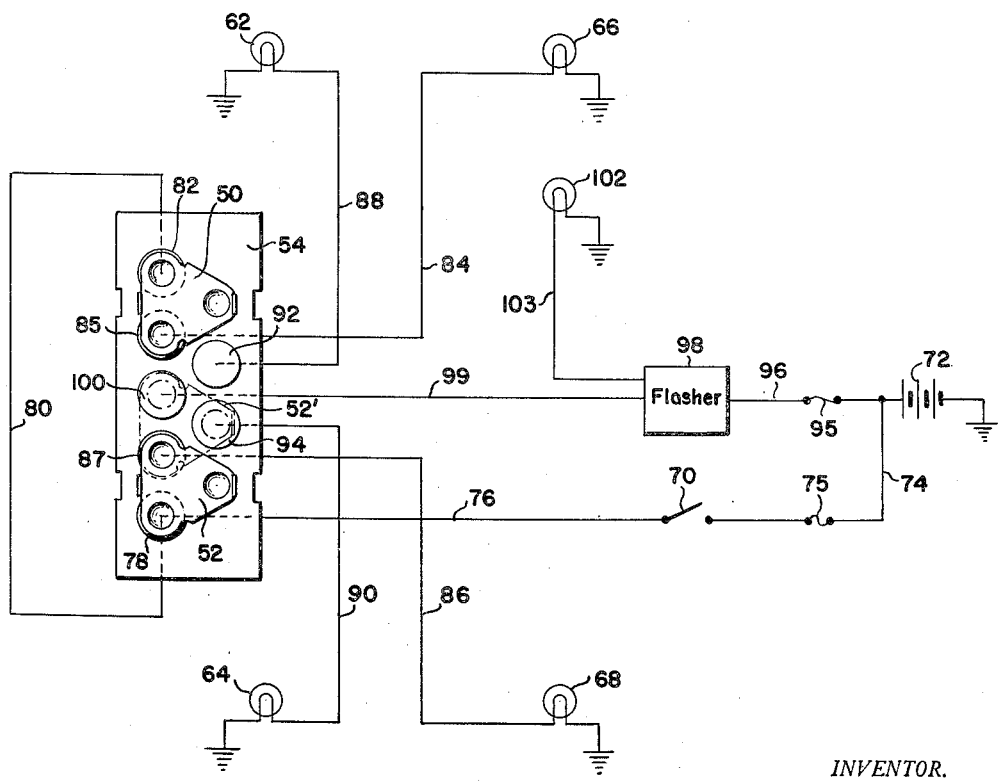

United States Patent Office 2,781,428
Patented Feb. 12, 1957

2,781,428

AUTOMOTIVE SIGNAL LIGHT CONTROL SWITCH

Robert R. Rossi, Audubon, N. J., assignor to Arrow Safety Device Company, Mount Holly, N. J., a corporation of New Jersey Application November 26, 1951, Serial No. 258,204

9 Claims. (Cl. 200—61.37)

This invention relates to a control switch assembly employed in a signal system for controlling turn and stop light signals such as are commonly used on motor vehicles.

It is an object of this invention to provide a switch of simple, economical and practical construction which is mounted on the steering column of a motor vehicle and manually operated by the driver of the vehicle to control turn signal lights.

It is a further object of this invention to provide a control switch assembly which is mounted on the steering column of a motor vehicle and which will automatically return from an operative position to a neutral position when the steering wheel of a motor vehicle is turned toward a neutral position in returning the wheels of the vehicle to a straight forward position after the vehicle has completed a turn.

These and other objects of the invention will become apparent from the following description when read in conjunction with the accompanying drawings, in which:

Figure 5 is a view showing the switch assembly mounted on the steering column of a motor vehicle; and Figure 6 is a diagrammatic showing of the electrical circuit employed.

Figure 1:
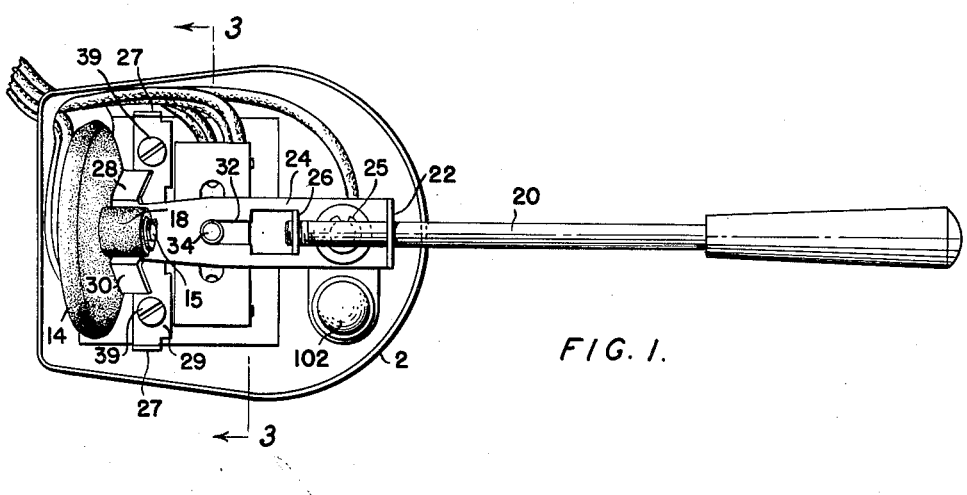
Figure 1 is a plan view of the switch assembly in a neutral position with the switch cover removed.

The switch assembly includes a switch casing base member 2 to which is attached a switch cover 4 by means of screws 6. The casing base member 2 is adapted to be mounted by means of a bracket 8 and a suitable clamp 10 to a steering column 12 of a motor vehicle.

A wheel 14 is rotatably mounted on a pin 15 on bracket 16 which is rigidly attached to the switch base 2. The wheel 14 is preferably made of rubber or some similar yielding material having wear resistant qualities and relatively high coefficient of friction. The wheel 14 is provided with an integral hub member 18 which rotates with the wheel, and is also preferably made of rubber.

A switch operating lever 20 is passed through an upturned end 22 of a switch actuating member 24 and is threaded into an upturned ear 26 of the member 24. The switch operating member 24 is provided at its left hand end, as viewed in Figure 1, with the two upwardly extending inverted V-shaped portions 28 and 30. The switch actuating member 24 is pivotally mounted on a mounting member 25 which is affixed to the switch casing base member 2. The switch operating member 24 is provided with a slot 32 which is adapted to engage a pin 34 of an electrical switch assembly 36.

The electrical switch assembly 36, which is mounted by means of screws 39 on studs 37 affixed to the switch casing base member 2, includes a switch cover 38 within which are retained two non-conductive sliding blocks 40 and 42. The blocks 40 and 42 are held apart by means of a spring 44 and have abutments 41 which are engaged by lugs 46 which extend downwardly from a plate 48 to which the pin 34 is attached. Movable contact plates 50 and 52 are affixed to the blocks 40 and 42, respectively, and are adapted to engage contact points mounted in a base plate 54 of the switch assembly as will be hereinafter described. The base plate 54 is made of a suitable insulating material.

The turn switch assembly is mounted on the steering column of the motor vehicle, as shown in Figure 5, with the rubber wheel 14 in engagement with the hub 56 of a steering wheel 58. It will be evident that, by this arrangement, rotation of the steering wheel will cause rotation of the wheel 14 which is in engagement with the hub 56.

In Figure 6 there is shown the conventional signal lighting circuit for a motor vehicle which includes right and left hand forward turn signal lights 62 and 64, respectively, and right and left hand rear turn signal lights 66 and 68, respectively. In this system the rear lights 66 and 68 also serve as stop light lamps. When the turn signal control switch is in a neutral position, the stop lights may be energized by closure of a conventional stop light control switch 70 controlled by the vehicle brake pedal in the usual manner, giving rise to a current flow from a battery 72, fuse 75 and conductor 74 to the stop light control switch 70, through conductor 76 to the turn signal light control switch, the base plate 54 of which mounts the switch contact connections and is shown in this electrical diagram. The conductor 76 is connected to the outer contact point 78 which is, in turn, connected through the conductor 80 to the opposite outer contact point 82. When the switch is in a natural position, the movable contact plates 52 and 50 provide connection between the lines 76 and 80 and through contact points 85 and 87, respectively, to the lines 84 and 86 to the rear signal lamps 66 and 68, respectively. The circuit is then completed through ground to the battery 72 in the conventional manner.

The forward signal lights 62 and 64 are connected by means of the conductors 88 and 90 to contact points 92 and 94, respectively, of the switch base plate 54. When the turn signal switch is in the neutral position, the contact plates 52 and 50 will be in the position shown and operation of the stop light switch 70 will serve to energize the rear lights 66 and 68 but will not energize the forward signal lights 62 and 64.

Figures 2, 3:
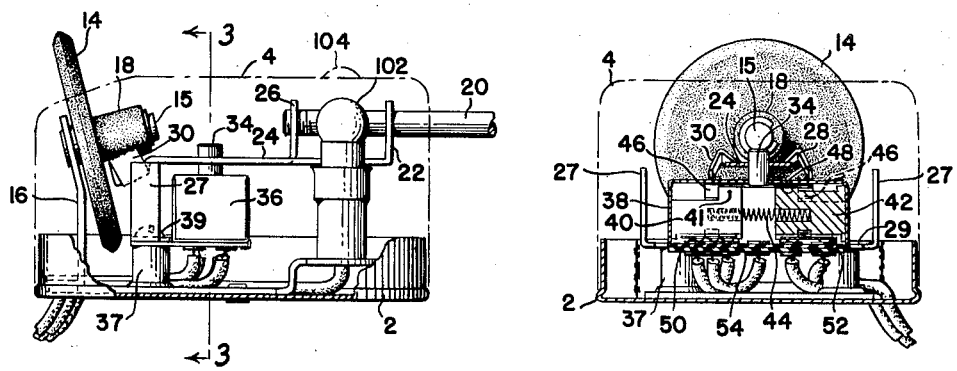
Figure 2 is a side elevation of the switch assembly shown in Figure 1.
Figure 3 is a vertical section of the switch assembly taken on the trace 3—3 indicated in Figure 2.
Figure 4:
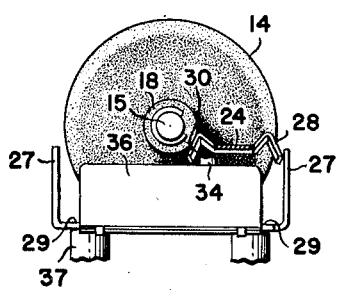
Figure 4 is a fragmentary showing of the switch assembly shown in Figure 3 with the switch assembly in an operative position.

When the turn switch lever 20 is in the neutral position, as shown in Figures 1, 2 and 3, the wheel 14 and the hub 18 thereof are free to rotate with the steering wheel hub 56. When the operator desires to energize the turn signal circuit through the switching means, he will move the lever 20 upwardly or downwardly, as viewed in Figure 1, about the pivotal mounting 25. Assuming the switch operating lever 20 to be moved downwardly, as viewed in Figure 1, the travel of the switch actuating member 24 is limited by contact of the inverted V-shaped portion 28 of the switch actuating member with the upstanding leg 27 of a stop bracket, as shown in Figure 4. The base portion 29 of the bracket 27 is mounted on the studs 37 by means of the screws 39 with the electrical switch assembly. By this operation of the switch lever 20, the inverted V-shaped portion 28 will move under the hub 18 of the wheel 14, the member 24 being sufficiently flexible to permit the upper point of the V to pass under the hub 18. By virtue of the motion limiting effect of the stop member 27, the inverted V-shaped member 28 will move only sufficiently far that the outer portion of the V will bear against the hub 18 as shown in Figure 4. With the switch in this position, a right hand turn is indicated. As the steering wheel 58 is turned in a right hand direction, the wheel 14 is rotated in a direction such that the friction of the hub 18 bearing against the V member 28 will urge the switch operating member 24 to remain in this position. When the motor vehicle has completed the turn, the operator thereof will return the steering wheel 58 towards its neutral or straight forward position by turning it in the opposite or left hand direction. Rotation of the steering wheel to the left will cause the rubber wheel 14, and the hub member 18 thereof, to be rotated by frictional engagement with the steering wheel in such a direction as to drive the inverted V-shaped portion 28 of the switch actuating member 24 downwardly, as viewed in Figure 1, whereupon the switch actuating member 24 will return to the neutral position, shown in Figure 1, at which the rubber wheel 14 and the hub 18 are free to rotate without engagement of either of the V-shaped members 28 or 30. It will be evident that the operator may at any time manually return the switch from an operative position to the neutral position.

From the foregoing, it will be evident that actuation of the switch operating rod 20 by the operator in either direction will result in the turn signal switch mechanism being locked in that position by engagement of the hub 18 with the outer portion of one of the inverted V-shaped portions, either 28 or 30, of the switch actuating member 24. From either of these positions, rotation of the steering wheel in one direction will merely cause the switch operating lever 24 to be further urged in that position and rotation of the steering wheel in the opposite direction will cause the switch operating member 24 to be returned to its neutral position by friction of the hub 18 rubbing against the particular inverted V-shaped portion 28 or 30 of the switch actuating member 24 with which it is engaged. The switch assembly is normally retained in the neutral position by the action of the spring 44, shown in Figure 3, urging the two blocks 40 and 42 outwardly and thus centrally positioning the pin 34 of the electrical switch assembly and with it the switch actuating member 24.

When the electrical switch assembly 36 is actuated as a result of operation of the turn signal lever 20 by the operator, one of the blocks 40 or 42 is moved toward the other block to energize the turn signal circuit as will now be described.

Assuming the lever 20 to be moved upwardly to indicate a left hand turn, the block 42, shown in Figure 3, will move toward the block 40 carrying with it the movable contact plate 52 which will then assume the position 52' shown in construction lines in Figure 6. The battery 72 is connected through a fuse 95, a conductor 96, a flasher mechanism 98 and a conductor 99 to the contact point 100 in the electrical switch base 54.

The flasher 98 may be of any conventional flasher mechanism, for example, such as shown in the Patent 1,979,349 to Schmidinger which serves to repeatedly interrupt the flow of current.

When the movable contact plate 52 assumes a position indicated at 52' in Figure 6, current flows from the battery 72 through the conductor 96, flasher 98, conductor 99, contact 100 and the contact plate 52' to the conductors 86 and 90 to the left hand rear and front signal lamps. These lamps will flash until the turn signal lever 20 is returned to a neutral position either by manual operation or by rotation of the steering wheel, as has been previously described, returning the contact plate 52 to its normal position, thereby opening the turn signal circuits.

A pilot light 102 is mounted within the switch case and is visible to the operator through a transparent cap 104 mounted in the switch case 4. The pilot light flashes in conjunction with the operation of the flasher 98 by connection thereto through conductor 103 when current is being drawn through the flasher by the turn signal lamps upon operation of the turn signal switch. As set forth in the patent to Thomas F. Young, No. 2,623,935, issued December 30, 1952, the rate of flashing of the signal light provides an indication to the operator of proper operation of the signal system.

When the lever 20 is moved downwardly to indicate a right hand turn, the movable contact member 50 will be displaced and make contact between the contact points 100, 92 and 85, thus energizing the right hand turn lights 62 and 66.

The friction wheel mechanism provides an extremely simple and practical means for returning a control switch to a neutral position in response to rotation of a steering wheel. The rubber friction wheel receives wear only when the switch is in an operative position indicating a turn and the steering wheel is rotated in the direction of that turn. During normal operation of a motor vehicle, when the turn signal is not being operated, the rubber wheel 14 rotates with the steering wheel hub 56 but, inasmuch as the wheel 14 is completely free to rotate, there is no load imposed on the wheel 14 or its hub 18 and thus no wear occurs on these parts.

It will be evident that various modifications may be made in the details of the embodiment of the invention as disclosed herein without departing from the scope of the invention as set forth in the following claims.

What is claimed is:

1. An automotive vehicle direction signal control switch responsive to movement of a steering member of the automotive vehicle comprising rotatable means adapted to be positioned in engagement with said steering member and to rotate in response to movement thereof, electrical switching means having a neutral position and an operative position on each side of its neutral position, and pivotally mounted means for actuating said electrical switching means and having a neutral position and an operative position on each side of its neutral position, said pivotally mounted means comprising a flat flexible strip of material extending from its pivot point and having its outermost end formed to provide a pair of spaced inverted V-shaped engaging members for engaging said rotatable means, one of said pair of engaging members engaging said rotatable means only when the pivotally mounted means is in one of its operative positions and the other of said engaging members engaging said rotatable means only when the pivotally mounted means is in the other of its operative positions, said flat flexible strip of material being adapted to be deflected when either one of said pair of engaging members is in engagement with said rotatable means, a first of said pair of engaging members when in its operative position engaging said rotatable means in a position to be urged toward its operative position by rotation of said rotatable means in response to movement of said steering member in one direction and to be urged toward its neutral position by rotation of said rotatable means in response to movement of said steering member in the other direction, and the second of said pair of engaging members when in its operative position engaging said rotatable means in a position to be urged toward its operative position by rotation of said rotatable means in response to movement of said steering member in said other direction and to be urged toward its neutral position by rotation of said rotatable means in response to movement of said steering member in said one direction.

2. A control switch responsive to movement of a steering member, said control switch comprising rotatable means adapted to be positioned in engagement with said movable member and to rotate in response to movement thereof, electrical switching means having a neutral position and an operative position, and pivotally mounted means for actuating said electrical switching means and having a neutral position and an operative position, said pivotally mounted means including means disengaged from said rotatable means only when the pivotally mounted means is in said neutral position and continuously engaging said rotatable means when the pivotally mounted means is in said operative position, said pivotally mounted means also including a flat flexible strip of material extending substantially from its pivot point and supporting said engaging means and adapted to be deflected when said engaging means is in engagement with said rotatable means, said engaging means when in the operative position engaging said rotatable means in a position to be urged toward its neutral position by rotation of said rotatable means in response to movement of said movable member in one direction.

3. An automotive vehicle direction signal control switch responsive to movement of a steering member of the automotive vehicle comprising rotatable means adapted to be positioned in engagement with said steering member and to rotate in response to movement thereof, electrical switching means having a neutral position and an operative position on each side of its neutral position, and pivotally mounted means for actuating said electrical switching means and having a neutral position and an operative position on each side of its neutral position, said pivotally mounted means including a pair of means for engaging said rotatable means disengaged from said rotatable means when said pivotally mounted means is in said neutral position, one of said pair of engaging means engaging said rotatable means continuously when the pivotally mounted means is in one of its operative positions and the other of said engaging means engaging said rotatable means continuously when the pivotally mounted means is in the other of its operative positions, said pivotally mounted means including a flat flexible strip of material extending substantially from its pivot point and supporting said pair of engaging means and adapted to be deflected when either one of said pair of engaging means is in engagement with said rotatable means, a first of said pair of engaging means when in its operative position engaging said rotatable means in a position to be urged toward its operative position by rotation of said rotatable means in response to movement of said steering member in one direction and to be urged toward its neutral position by rotation of said rotatable means in response to movement of said steering member in the other direction, and the second of said pair of engaging means when in its operative position engaging said rotatable means in a position to be urged toward its operative position by rotation of said rotatable means in response to movement of said steering member in said other direction and to be urged toward its neutral position by rotation of said rotatable means in response to movement of said steering member in said one direction.

4. In a self-cancelling automobile directional signal control adapted to be disposed on the steering gear of an automobile and including an actuating arm having an inoperative and an operative position, a spindle, a friction wheel mounted on said spindle, said friction wheel being in frictional contact with the steering wheel to be driven thereby, a hub mounted on said spindle and movable with the friction wheel, an interrupted gear member secured on said actuating arm, said interrupted gear member being comprised of a resilient portion to bias said gear member toward the hub of the friction wheel to provide an endwise engagement between the hub of the friction wheel and the gear member, the interruption in the gear member normally accommodating the hub of the friction wheel, said gear member being movable by said actuating arm from normal position to operative position, the operative portion of the gear member being in abutment with the hub when the gear member is in operative position, said gear member being flexed downwardly when in operative position, said operative portion of the gear member being driven by said hub when in operative position and being movable by said hub from operative to inoperative position.

5. A device as set forth in claim 4, wherein the bias action of the gear member is in a plane parallel to the friction wheel.

6. A device as set forth in claim 5, wherein said gear member has a head part having an interruption therein said interruption being flanked by two uninterrupted operative surfaces.

7. In a self-cancelling automobile directional signal control adapted to be disposed on the steering gear of an automobile and including an actuating arm having an inoperative and an operative position, a spindle, a friction wheel mounted on said spindle, said friction wheel being in frictional contact with the steering wheel to be driven thereby, a hub mounted on said spindle and movable with the friction wheel, a gear member secured on said actuating arm, said gear member being comprised of a head part, a body part to carry said head part, a base part to carry said body part, and a resilient portion to bias said head part toward the hub of said friction wheel to provide an endwise engagement between the hub and the head part, said head part being comprised of an interruption and two uninterrupted operative surfaces flanking said interruption, the interruption in the head part normally accommodating the hub of the friction wheel, said gear member being movable by said actuating arm from normal position to operative position, the operative surface of the head part being in abutment with the hub when the gear member is in operative position, said gear member being flexed downwardly when in operative position, said operative surface of the head part being driven by said hub when in operative position and being movable by said hub from operative to normal position.

8. A device as set forth in claim 7, wherein said resilient portion is interposed between the body part and the base part of the gear member.

9. A device as set forth in claim 8, wherein said body part and said base part are integral with said resilient portion and extend in opposite directions therefrom.

References Cited in the file of this patent
UNITED STATES PATENTS

| | | |
|---|---|---|
| 1,928,315 | Marten et al. | Sept. 26, 1933 |
| 1,991,960 | Routery | Feb. 19, 1935 |
| 2,016,908 | Routery | Oct. 8, 1935 |
| 2,035,266 | Everitt | Mar. 24, 1936 |
| 2,271,655 | Matheson et al. | Feb. 3, 1942 |
| 2,296,585 | Tobias | Sept. 22, 1942 |
| 2,596,440 | Sampson | May 13, 1952 |
| 2,596,858 | Lapidus | May 13, 1952 |
| 2,604,560 | Dibelka | July 22, 1952 |
| 2,611,047 | Barcus | Sept. 16, 1952 |
| 2,676,218 | Augenstein | Apr. 20, 1954 |
| 2,684,601 | Putterman | July 27, 1954 |